United States Patent [19]

Worden

[11] 3,873,760

[45] Mar. 25, 1975

[54] FLESH TONE CORRECTION USING COLOR DIFFERENCE SIGNALS

[75] Inventor: Robert Francis Worden, Portsmouth, Va.

[73] Assignee: General Electric Company, Portsmouth, Va.

[22] Filed: Oct. 18, 1972

[21] Appl. No.: 298,650

[52] U.S. Cl. ..................................... 358/21, 358/28

[51] Int. Cl. ............................................. H04n 9/12

[58] Field of Search ..................... 178/5.4 R, 5.4 HE

[56] References Cited

UNITED STATES PATENTS

| | | | |
|---|---|---|---|
| 3,729,578 | 4/1973 | Slusarski | 178/5.4 HE |
| 3,749,825 | 7/1973 | Moore | 178/5.4 HE |

*Primary Examiner*—Robert L. Richardson

[57] ABSTRACT

A system for a color television receiver which produces improved flesh tones in the presence of aberrant phase shifts in a received chroma signal. Means are provided for deriving three color difference signals from a received chroma signal. Predetermined portions of each color difference signal is applied to two signal summing devices for producing two modified color difference signals. The two modified color difference signals are then applied to suitable matrixing means for combination with a luminance signal. A third, unmodified color difference signal is applied directly to the matrixing means to complete the required color information.

8 Claims, 4 Drawing Figures

FLESH TONE CORRECTION USING COLOR DIFFERENCE SIGNALS

BACKGROUND OF THE INVENTION

The present invention relates generally to color television receivers and, more particularly, to circuit means for effecting an improved rendition of flesh tones in a displayed image.

Present-day color television receivers constructed to receive signals transmitted in accordance with NTSC standards are, in most cases, capable of reproducing all colors substantially as sensed by a television camera. However, in the actual transmission of such signals aberrations often occur which cause the colors displayed by the receiver to deviate substantially from those intended. As is commonly known to those skilled in the art, under the NTSC standard certain color or "chroma" information is transmitted by means of a pair of subcarriers lying in substantial quadrature and both amplitude and phase modulated. Chroma information is taken to comprise both a hue and a saturation component. Hue information indicates the shade of color desired, while saturation corresponds to the depth or richness of the color, and is represented in part by the amplitude of the aforementioned signals. Change in signal amplitude may, for example, cause a deviation in a red hue from a deep red to a pink. On the other hand a deviation in phase of the same signal could cause the intended red hue to shift toward orange, or toward magenta.

The present invention operates to compensate for deviations in phase of a received signal representing flesh tone information, it being anticipated that most changes in saturation will not affect flesh tone rendition as substantially as will aberrations in phase.

In order to properly demodulate the phase-modulated chroma signals a reference signal is needed, and is supplied in the form of a 3.58 MHz sine wave or "burst" signal which occurs at the "back porch" of each horizontal synchronizing signal. After the scanning of each horizontal line the receiver circuitry responsible for generating a reference signal is brought into phase with the transmitted reference or burst signal. Unfortunately, it often occurs that the relationship between the phase of transmitted chroma and burst signals deviates so that, despite the fact that a receiver is generating a properly-phased reference signal, that received chroma signal produces an improper hue when demodulated.

Aberrations in hue and saturation often go unnoticed by television viewers, since the colors of objects in televised scenes quite often are arbitrary. However, human skin tones are easily recognizable and correspond to a small portion of the color spectrum so that deviations in the phase of a chroma signal carrying flesh tone information may produce differences in hue which, though slight, are readily noticed by an observer. Slight shifts in hue toward magenta or green produce unpleasant and unrealistic skin tones which detract from the acceptability of the displayed image.

For this reason, many attempts have been made to provide color television receivers with means for mitigating such shifts in displayed flesh tones. In one such scheme, disclosed in U.S. Pat. No. 3,525,802 — Whiteneir, red or yellow chroma signals are utilized to generate a synthetic flesh tone information so that flesh tones are displayed, even when not present in a received signal. In other cases, complex biasing schemes are used to change the color temperature of the overall display so that flesh tones appear more realistic. In still another approach, taught in U.S. Pat. No. 3,536,827 — Bell, amplifiers and resistor matrixes are used to cross-couple a pair of color difference signal paths to provide an intermixing of the color difference signals according to a predetermined mathematical relationship so that two new color difference signals are produced, each being a "hybrid" containing elements of both color difference signals. While such an approach has some merit it relies upon information from only two of the three color difference signals, and further requires the provision of a special amplifier for each of the color difference signal paths being operated on. It will thus be seen that it would be advantageous to provide improved means for promoting the rendition of flesh tones in a color television receiver.

It is therefore an object of the present invention to provide improved means for mitigating aberrations in flesh tones displayed by a color television receiver.

It is a further object of the invention to provide improved means for combining color difference signals to effect improved flesh tone rendition.

It is still another object of the present invention to provide improved means for combining several color difference signals, which requires only a single amplification stage.

SUMMARY OF THE INVENTION

Briefly stated, in accordance with one aspect of the invention the foregoing objects are achieved by providing means for abstracting a predetermined portion of each of three color difference signals and adding these portions to summing means to produce two new color difference signals, each of which comprises elements of all three color difference signals. Each of the two new color difference signals is applied to utilization means for producing a color display. The remaining color difference information is provided by applying one of the three original color difference signals directly to the utilization means.

In one embodiment, the R−Y signal is applied unmodified to the utilization means, while the other required color difference signals are comprised of predetermined proportions of R−Y, B and G−Y signals.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
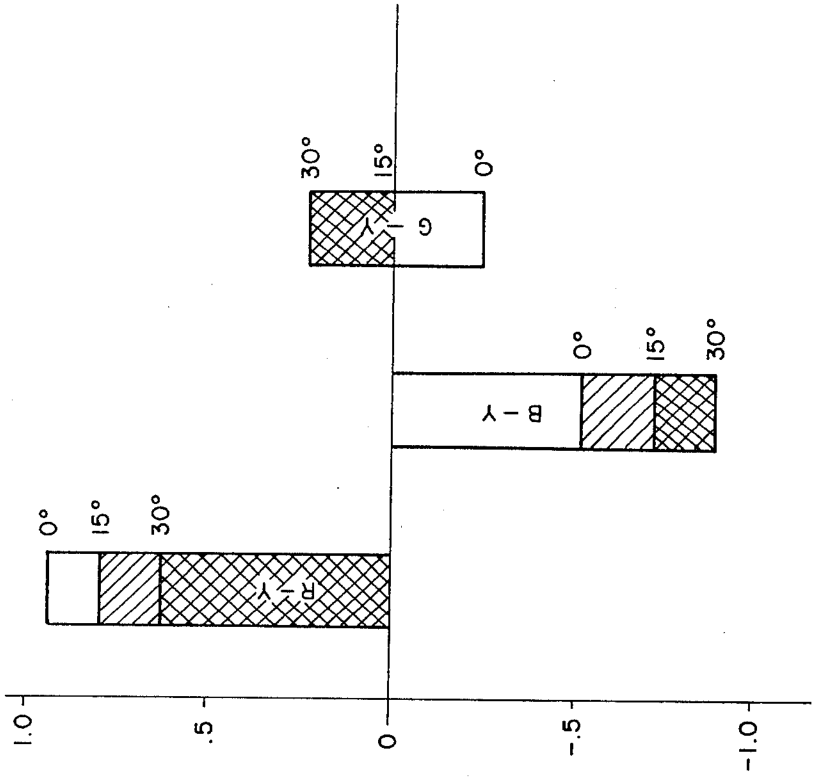
FIG. 1 is a graphical representation useful in understanding the present invention.

FIG. 1 illustrates normalized color difference signal voltage used to produce flesh tones in a color television receiver constructed for use in an NTSC system. For purposes of illustration, the voltage signal produced by each color difference amplifier is considered to have a maximum value of 2. By considering the maximum voltage excursions to occur about an arbitrary central axis, the color difference signals may each be assigned a maximum "positive" value of 1 and a maximum "negative" value of 1.

In order to produce upon the face of a three-gun shadow mask cathode ray tube a color display which has the appearance of flesh tones, predetermined proportions of red, blue and green light are needed. In order to effect the requisite composite light output, color difference signals are needed whose normalized proportions are illustrated in FIG. 1. Under ideal situations, approximately 95 percent of the maximum positive R-Y (red color difference) voltage is required, along with approximately 53 percent of the negative normalized B—Y (blue color difference) voltage, and 26 percent of the maximum positive G-Y (green color difference) voltage. As is known by those skilled in the art, R-Y, B—Y and G—Y signals may be conceived of as resolutions along predetermined axes of a single vector whose length and angular orientation correspond to a given color. As the received flesh tone signal changes, however, the proportioning of the components comprising the vector change. Referring again to FIG. 1, if the received chroma signal retreats in phase by 15 percent, the projection of the "flesh" vector upon the so-called R-Y axis decreases, with a corresponding increase on the orthagonal, B—Y axis. This is demonstrated by a lessening of the normalized R-Y value represented of FIG. 1 so that only approximately 80 percent of the maximum available R—Y signal is now provided, while the normalized B—Y signal has increased to approximately 73 percent of its maximum negative normalized value. At the same time the G—Y signal, which corresponds to a projection of the flesh color vector upon the G—Y axis, is reduced to substantially zero. The effect is to produce a greenish shift in the displayed hue.

A further departure from the correct phase angle causes an additional reduction of the R—Y value to approximately 63 percent of its anticipated maximum. At the same time, the B—Y value increases to substantially 90 percent of its maximum negative excursion. The G—Y signal continues its positive-going trend and attains approximately 23 percent of its maximum anticipated positive value. The effect of the foregoing changes in the proportioning of color difference signals causes a further shift in the hue of displayed flesh tones, tending to produce tones with more pronounced greenish tinge. As will be recognized by those skilled in the art, the change in relative phase of the chroma signals has no effect on the Y or luminance portion of the transmitted signal so that the only perceptible shifts in displayed hue are due to changes in the values of the color difference signals.

It is apparent that, for any given change in the values of a transmitted signal, compensatory circuitry can be devised which modify the relative values of the color difference signals and return them to their original, intended values. However, the signal phase fluctuations which cause the aberrations discussed above occur in varying degrees at randon times, rather than in predictable, discrete steps. Further, it is likely that modifications of color difference signal values which would restore the signals to their exact intended values for flesh tones would cause undue distortion of other displayed hues. Therefore, it is extremely desirable that a way be found to modify the color signals which will compensate for differing degrees of phase shift, without unduly disturbing other hues. Moreover, in a production television receiver it is necessary that this disideratum be achieved economically, without the use of a multiplicity of amplifying stages.

Figure 2:
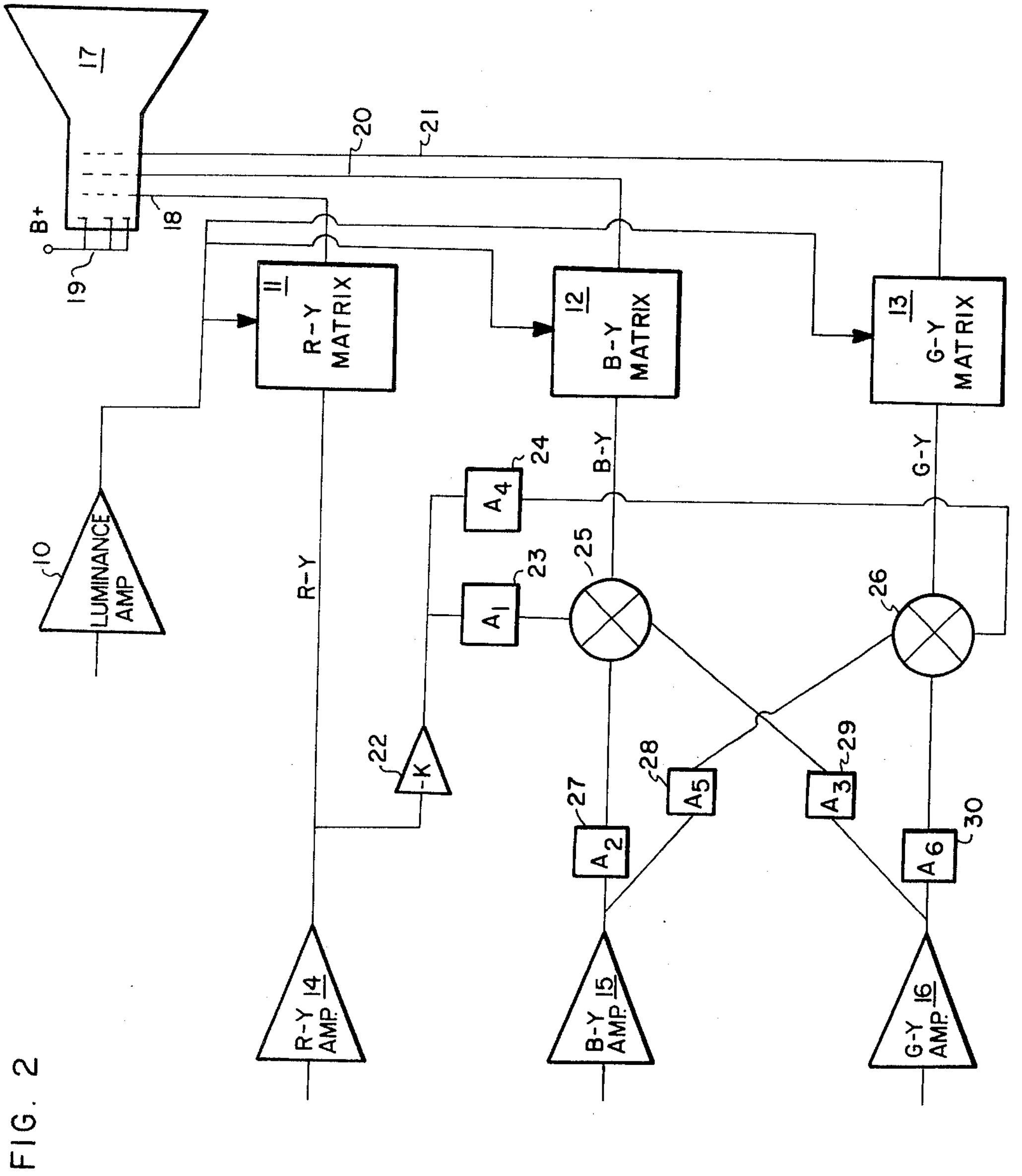
FIG. 2 is an idealized schematic representation of one system embodying principles of the present invention.

FIG. 2 shows in idealized, schematic form a system adapted to provide the desired color signal correction. A broadcast signal is received by the antenna and tuning stages of a television receiver, and transmitted to conventional processing circuitry (not shown) which may, for example, separate the audio, video and synchronizing portions of the received signal. The video signal is then split into two portions: a luminance or Y signal, and a chrominance signal containing R—Y and B—Y color difference signals encoded in quadrature. As is known by those skilled in the art, the third or G—Y signal can be reconstituted by combining predetermined portions of the demodulated R—Y B—Y B-Y signals in a so-called "matrixing" stage.

In the system illustrated, the Y or luminance signal is transmitted to a luminance amplifier 10, and the applied to matrixing 11, 12 and 13. The R—Y, B—Y and G—Y signals are applied to their respective amplifiers 14, 15 and 16 and then transmitted to the respective matrixing means 11, 12 and 13. In each matrixing means, a common luminance or Y signal is added to a color difference signal. The result is "pure" red, blue or green color signal which is then applied to a control electrode of a cathode ray tube 17. For example, an R—Y signal and a Y signal are applied to first matrixing means 11. The algebraic sum of the combined signals is simply an R or red signal which is applied to a first, "red" grid 18 of cathode ray tube 17. Similarly, the B—Y and Y signals are combined in second matrixing means 12 and applied to a second or "blue" grid 20 while the G—Y and Y signals are added in third matrixing means 13 to produce a green signal, to be applied in turn to third or "green" grid 21. The disclosed system thus comprises what is known as the RGB system wherein red, green and blue signals are each applied directly to one control electrode of a cathode ray tube.

Instead of using the matrixing means shown, one alternative approach would be to apply the luminance signal to the cathodes 19 of the cathode ray tube 17, and apply the color differences signals directly to the grids thereof so that the cathode ray tube itself becomes the means for matrixing the luminance and color difference signals. It will therefore be understood that the disclosed RGB system is used for purposes of illustration only, to disclose one embodiment of the inventive system.

Turning now to the flesh tone correction system, amplifying means such as amplifier 22 is coupled to the R—Y signal path. While the gain of amplifying means 22 may be varied it is assumed to be negative, i.e., amplifer 22 operates to reverse the polarity of the R—Y color difference signal applied thereto. In this context "polarity" is used in the same sense as in FIG. 1; that is, quiescent or "zero" AC voltage is taken to be halfway between the maximum and minimum excursions of signals produced by R-Y amplifier 14. This level can be established through proper biasing of either color difference amplifier 14 or amplifier 22.

Amplifier 22 when presented with a positive-going R—Y signal amplifies it by a factor K and produces a corresponding negative-going signal. The signal produced by inverting amplifier 22 is then applied to first and fourth signal proportioning means 23 and 24 having attenuating factors of $A_1$ and $A_4$, respectively.

The signal proportioning means serve to transmit a predetermined portion of an applied signal and may, for example, comprise resistive networks which serve as voltage dividers. Switching means may advantageously incorporate into the signal proportioning means for disabling them when correctly-phased chroma signals are being received. Swtiching means may also be utilized to vary the values of the signal proportioning means in unison, to deal alternatively with minor or gross signal phase deviations. Proportioning means 23 is coupled to a first signal combining means 25 which may be considered to lie in the B—Y signal path, and whose output is coupled to matrixing means 12. Signal proportioning means 24 is coupled to one input of another signal combining means 26 whose output is applied to matrixing means 13.

The output of B—Y amplifier 15 is applied to second and fifth signal proportioning means 27 and 28, respectively. Proportioning means 27 has an attenuating factor $A_2$ and transmits a predetermined portion of the B-Y signal to a second input of signal combining means 25 while proportioning means 28, with a factor of $A_5$, applies another portion of the B—Y signal to a third input terminal of a signal combining means 26.

In like manner, third and sixth signal proportioning means 29 and 30 are coupled to the output of G—Y amplifier 16. Signal proportioning means 29, having an attenuating factor $A_3$, is coupled to the third input terminal of signal combining means 25 while proportioning means 30 which has a factor of $A_6$ is coupled to the second input terminal of signal combining means 26.

In operation, a red color difference signal is processed through R—Y amplifier 14 and applied directly to first matrixing means 11, whereby the desired "red" signal is produced. If a correct chroma signal is being received, the various signal proportioning means 23, 24, 27, 29, 29 and 30 are maintained in an inoperative mode. Signal combining means 25 then applies the B-Y signal outputted by amplifier 15 directly to matrixing means 12 while signal combining means 26 transmits the G-Y G—Y produced by amplifier 16 to matrixing means 13. In the event an aberrant chroma signal is received the signal proportioning elements of the correction system may be activated so that an R—Y signal of reversed polarity, and increased by the product K of and $A_1$, is applied to the first input terminal of signal combining means 25; a modified B—Y signal, having a value of $(B-Y)\ A_2$, is applied to the second input terminal of signal combining means 25; and the third input terminal of signal combining means 25 receives a portion of the G—Y signal designated G—Y $A_3$. The new color difference signal B—Y' outputted by signal combining means 25 may then be represented by the expression $$B-Y' = (R-Y)\ (-K)\ A_1 + (B-Y)\ A_2 + (G-Y)\ A_3.$$

In like manner, the amplified, inverted R—Y signal —K (R—Y) is passed through signal proportioning means 24 so that the signal $(R-Y)\ (-K)\ A_4$ appears at the first input terminal of second signal combining means 26. At the second input terminal a modified green color difference signal $(G-Y)\ A_6$ is applied, while a modified blue color difference signal $(B-Y)\ A_5$ is applied to the third input terminal thereof. The output G—Y' of signal combining means 26 may now be represented as $$G-Y' = (R-Y)\ (-K)\ A_4 + (B-Y)\ A_5 + (G-Y)\ A_6.$$

It will now be seen that the blue and green color difference signal paths are treated in essentially the same manner, while the red color difference signal path is essentially unchanged. It is anticipated that the input impedance of amplifier 22 will be sufficient to prevent perturbations of the red color difference signal received by first matrixing means 11.

While the values of the various signals will vary from one receiver design to the next, and will depend further upon desired color temperature and phosphor characteristics, certain relationships have been experimentally established for one NTSC type receiver. For correcting aberrant chroma signal phase shift in the range from 0°–15° the following factors are considered optimum:

| Factor | Value |
|---|---|
| K $A_1$ | —.334 |
| $A_2$ | .66 |
| K $A_4$ | —.06 |
| $A_5$ | .118 |

The values for $A_3$ and $A_6$ are considered to be of little importance since the value of the G—Y signal is extremely small. For present purposes, $A_3$ and $A_6$ may each be considered to have a value of zero.

For phase shifts in the region of 15° to 30° somewhat different values are desirable. These values however, are also effective in the presence of smaller phase shifts and maintain acceptable flesh tones over a broad range of chroma signal phase angles.

| Factor | Value |
|---|---|
| K $A_1$ | —.68 |
| $A_2$ | .415 |
| $A_3$ | .17 |
| K $A_4$ | —.195 |
| $A_5$ | .115 |
| $A_6$ | .76 |

The inventor has discovered that it is feasible to operate upon the color difference signals in the asymmetrical fashion described, modifying the proportions of blue and green color difference signals presented to the matrixing stage without measurably changing the red signal. Such an approach has the advantage of providing a saving in circuit hardware since only two out of three of the color difference signal paths contain signal summing means, and only one active device inverting amplifier 22 is required.

Figure 3:
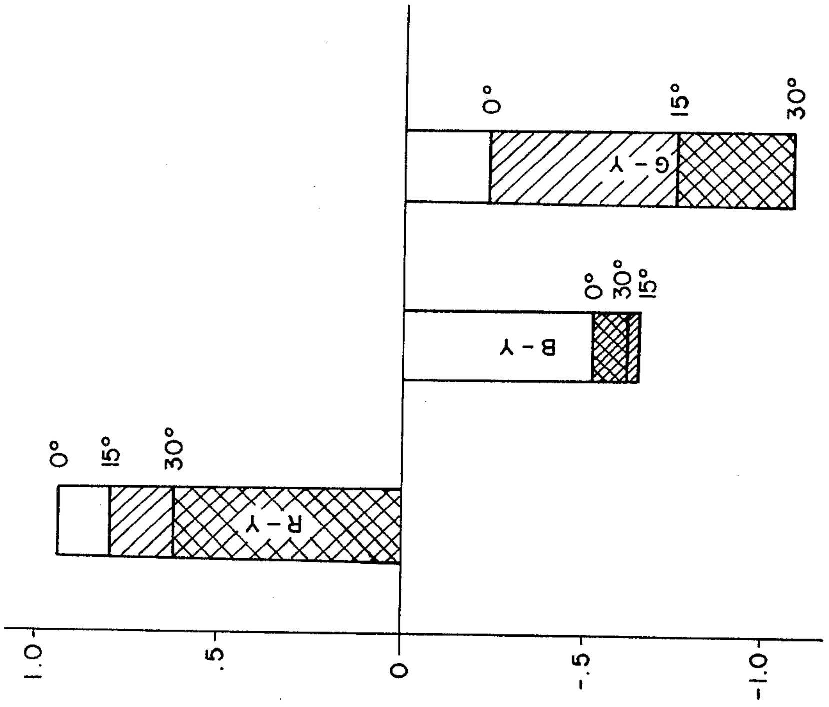
FIG. 3 is another graphical representation illustrating the operation of the described embodiment.

Turning now to FIG. 3, the effect of the flesh tone conrrection circuit upon normalized color difference singals is shown. When signal proportioning means having the first-enumerated values are energized in the presence of a chroma signal phase shift of 15°, the normalized red color difference signal decreases from substantially 94 percent of its maximum positive value to approximately 80 percent thereof. The new B−Y color difference signal B−Y′, however, has been caused to increase from its original value of 53 to 62 percent of maximum negative value. Instead of going to zero, the new G−Y signal G−Y′ increases to substantially 76 percent of its maximum normalized negative value.

It can be seen from FIG. 3 that the new color difference signals have not been reapportioned so as to return to their original values. The phase-related excursions of the B−Y signal have been drastically reduced; however, rather than reducing the aberrant excursion of the G−Y signal it has been driven further negative, beyond its original, nominal value. At the same time, the R−Y signal remains unmodified.

An extension of the foregoing approach to compensate for a much larger phase shift is apparent from the signal levels resulting from utilizing the second-enumerated values in signal attenuating means $A_1$–$A_6$, in the presence of a 30° phase deviation. The R−Y signal is allowed to undergo a diminution to substantially 60 percent of the proper positive value for flesh tone reproduction. However, through a switching arrangement provided in conjunction with the various signal proportioning means the gains thereof, designated $A_1$–$A_6$, are changed so that in the presence of signal aberrations in the magnitude of 30° adequate compensation can be effected. In the present instance, with an anticipated 30° phase shift of the chroma signal, the modified blue color difference signal B−Y′ approximates 65 percent of its maximum negative value, a relatively small deviation from the correct value for flesh tones. At the same time the negative excursion of the modified G−Y signal, now designated G−Y′, approximates 98 percent of the maximum negative G−Y signal, a substantial departure from its nominal flesh tone value.

It will now be seen that the inventor has discovered that it is possible to offset changes in phase of a received chroma signal by operating upon only two of three color difference signals encoded therein. While it is apparent that the color signal components have not been returned to their original values, the observed result has nonetheless been found to be acceptable. It is believed that the human eye integrates different combinations of variously-saturated red, blue and green hues to perceive similar results, which in this case approximate flesh tones. Therefore, apparent flesh tones can be reproduced without the necessity of reproducing nominally correct combinations of hue and saturation.

Figure 4:
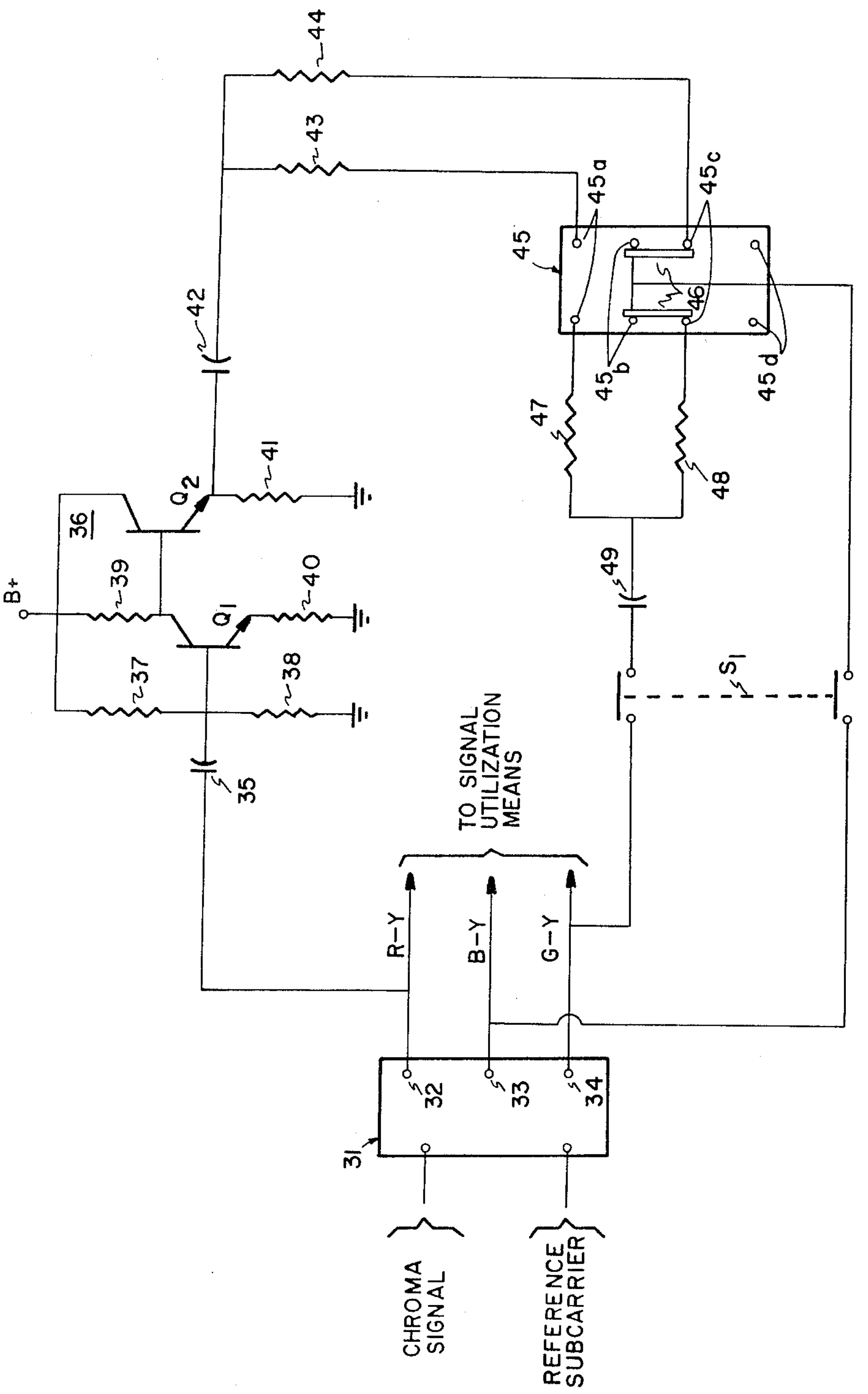
FIG. 4 is a schematic drawing of a circuit constructed in accordance with teachings of the invention.

FIG. 4 is a schematic diagram of a circuit useful for practicing the disclosed invention in a production television receiver. An integrated circuit 31, which may comprise a predominant portion of the chroma processing circuitry, is provided with three output terminals 32, 33 and 34. Terminal 32 comprises the output of an R−Y color difference amplifier contained within integrated circuit 31, while terminals 33 and 34 comprise outputs of the B−Y and G−Y amplifiers, respectively.

The demodulated chroma signal appearing at the R−Y output terminal 32 is transmitted to suitable utilization means (not shown) and is also applied by way of blocking capacitor 35 to an inverting amplifier generally indicated at 36. In the form shown, amplifier 36 comprises first and second transistor $Q_1$ and $Q_2$. First and second biasing resistors 37 and 38 are coupled in series between a suitable source of biasing potential, denominated B+, and a point of reference potential such as ground. A third resistor 39 couples the source of biasing potential to the collector of first transistor $Q_1$, and the emitter thereof is coupled to ground by means of resistor 40. Another resistor 41 connects the emitter of second transistor $Q_2$ to a source of reference potential, the collector thereof being connected directly to B+. A second blocking capacitor 42 is coupled to the emitter terminal of transistor $Q_2$, the distal end of capacitor 42 being connected to each of resistors 43 and 44. Resistors 43 and 44 are in turn coupled to appropriate terminals of a three-position switch 45. Switch 45 in the form shown comprises four pairs of contacts denominated **45*a*–45*d*, and a pair of movable contact elements 46 which serve to bridge two adjacent pairs of contacts at any given time. Resistors 47 and 48 are coupled to terminals which lie opposite those which resistors 43 and 44 are attached, and another blocking capacitor 49 is coupled to the distal ends of resistors 47 and 48. A first, upper set of contacts of a master switch $S_1$ serves to couple one side of capacitor 49 to the G−Y transmission path. Another, lower set of contacts of switch $S_1$ couples the B−Y transmission path to a pair of opposed contacts 45*b* on switch 45.**

The operation of the circ uit shown in FIG. 4 will now be described, with reference to the elements enumerated therein. The R−Y signal produced within integrated circuit 31 and appearing at terminal 32 is applied to subsequent utilization circuitry (not shown) substantially unaffected by the presence of amplifier 36. This is true due to the relatively high impedance presented by the amplifier to the R−Y signal path. In operation, an R−Y signal traverses blocking capacitor 35 and appears at the base terminal of transistor $Q_1$. The base terminal is appropriately biased by means of resistors 37, 38 which act as a voltage divider to apply a predetermined D.C. voltage transistor. Dropping resistors 39 and 40 couple transistor $Q_1$ between a point of bias potential and a point of reference potential and support a voltage drop thereacross representative of the state of conduction of $Q_1$.

When a positive-going R−Y signal is applied to the base of $Q_1$, it serves to cause $Q_1$ to increase conduction, increasing the voltage drop across resistor 39 and producing an amplified negative-going signal at the base of $Q_2$. The negative-going signal serves to drive $Q_2$ out of conduction, lessening the amount of current flowing therethrough and so through resistor 41. With $Q_2$ near saturation the emitter of $Q_2$, and therefore the upper end of resistor 41, will attain a voltage approximately equal to the biasing potential. However, as $Q_2$ conducts less and less, voltage appearing at the top of resistor 41 decreases. It will therefore be seen that transistors $Q_1$ and $Q_2$ operate to reverse or invert color difference signals produced at terminal 32. While color difference signals are often conceived to be DC signals whose values change as a function of hue and saturation, the rapidity with which they change allows them to be treated for present purposes as an AC signal.

Selector switch 45 is constructed so that sliders 46 can bridge only adjacent ones of the pairs of terminals provided thereon. Four pairs of terminals **45*a*–45*d* are provided, so that three discrete switch positions occur. In the first position, with sliders 46 fully elevated so the two uppermost pairs of contacts 45*a* and 45*b* are connected, resistors 43 and 47** will be serially coupled between the conductor leading to G−Y output terminal 34 and the output of amplifier 36. It will be seen that the conductor leading to B−Y terminal 33 is coupled to the second pair of contacts 45*b* so that terminal 33 is effectively connected to the intersection of serially-connected resistors 43 and 47.

In a second position, that shown in FIG.4, switch members 46 bridge terminals 45*b* and 45*c* so that resistors 44 and 48 are coupled in series between the G−Y terminal 34 and amplifier 36. B−Y output terminal 33 is still coupled to the sliders 46, and thus to the intersection of serially-connected resistors 44 and 48. In the third or "inactive" position sliders 46 bridge the lowermost two pairs of terminals 45*c*, 45*d* and serve to disable the system so that inverted R−Y signals produced by amplifier 36 are not coupled to the B−Y or G−Y signal paths.

With selector switch members 46 in the position shown in FIG. 4, the amplified, inverted R−Y signal flows through resistor 44, and through the switch members 46 to blocking capacitor 49 by way of resistor 48. With master switch $S_1$ in a closed position, the signal thus provided is applied to G−Y output terminal 34. At terminal 34, in addition to the original G−Y signal there now appears an inverted, amplified R−Y signal which has undergone a degree of attenuation determined by the values of resistors 44 and 48 and the output impedance at terminal 34. In similar fashion, the R−Y signal traversing resistor 44 flows through the right-hand one of switch members 46, the lower contacts of master switch $S_1$ and impinges upon the B−Y output terminal 33. The magnitude of the amplified, inverted R−Y signal appearing at terminal 33 exhibits a degree of attenuation reflecting the values of resistor 44 and the output impedance at terminal 33.

Switch 45 also provides for mixing of the G−Y and B−Y signals. With selector switch 45 in the position illustrated and master switch $S_1$ closed, the G−Y and B−Y signal paths are coupled by capacitor 49 and resistor 48 so that an intermixng of the two color difference signals occurs. With switch members 46 in the first or uppermost position a similar intermixing would take place, the value of which would be modified to reflect the interposition of resistor 47 for resistor 48.

In addition to the intermixing of the signals described above, the value of the B−Y and G−Y signals arising at output terminals 33 and 34 is affected by the connection thereto of various portions of the illustrated network. The impedance presented to each color difference signal is lessened since the series combination of resistor 47 or 48 and the output impedance of another color difference amplifier is essentially placed in parallel with the input impedance of the B−Y and G−Y signal utilization means.

It will now be seen that, in contradistinction to the high impedance presented to the R−Y signal by amplifier 36, when master switch $S_1$ is closed and the contacts of selector switch 45 are in either the uppermost or intermediate position a relatively low impedance is presented to both the B−Y and G−Y signal paths. Selector switch 45, in combination with the resistances coupled thereto, may therefore be considered as both a signal combining and signal attenuating means for it provides both the intermixing and predetermined attenuation of the G−Y and B−Y color difference signals. For instance, with master switch $S_1$ open only the input impedance of the signal utilization means is presented to output terminal 33 of the B−Y color difference amplifier. However, with the switch $S_1$ closed and sliders 46 of selector switch 45 in the position illustrated in FIG. 4 a first series circuit comprising resistor 48 and the output impedance of G−Y amplifier, and a second series circuit comprising resistor 44 and the output impedance of inverting amplifier 36, are effectively connected in parallel with the input impedance of the B−Y utilization means. Disregarding for the moment the application of the G−Y signal to B−Y output terminal 33, it will be apparent that the additional impedance now coupled in parallel with the B−Y signal utilization means produces an additional loading on the B−Y amplifier and serves to attenuate the B−Y signal produced thereby.

Similarly, additional loading is applied to output terminal 34 of the G−Y amplifier. This loading comprises the output impedance of the B−Y amplifier in parallel with the series combination of resistor 44 and the output impedance of inverting amplifier 36, all in series with resistor 48. The net effect is to attenuate the G−Y signal which is applied to the G−Y signal utilization means.

The circuit illustrated in FIG. 4 is thus functionally equivalent to that disclosed in FIG. 2, though the individual signal attenuation means shown in FIG. 2 have been combined utilizing the principle of superposition. With the switch members 46 in the position illustrated, resistor 48 serves as a signal attenuating means for G−Y signals being transferred to the B−Y signal path, and vice versa. Further, the parallel combination of a first circuit including the output impedance of another color difference signal amplifier, and a second circuit comprising a resistor in series with the output impedance of amplifier 36, constitutes a signal attenuation means for the B−Y and G−Y color difference signals. The resulting signal attenuation is essentially the ratio between the total impedance presented to a given color difference amplifier, and this total impedance less the output impedance of the color difference amplifier itself.

While it will be understood that values of the various circuit components may be varied to suit a particular application, the following values of circuit components are given by way of example :

| Resistors | |
|---|---|
| 37 | 75 Kilohms |
| 38 | 24 Kilohms |
| 39 | 3.6 Kilohms |
| 40 | 2.4 Kilohms |
| 41 | 3.0 Kilohms |
| 43 | 100 ohms |
| 44 | 470 ohms |
| 47 | 470 ohms |
| 48 | 820 ohms |

Output impedance of color difference amplifiers: 180 ohms

| Capacitors | |
|---|---|
| 35 | 47 microfarads |
| 42 | 47 microfarads |
| 49 | 47 microfarads |
| **Transistors** | |
| $Q_1$ | Type 2N3858 A |
| $Q_2$ | Type 2N3858 A |

It will now be seen that there has been disclosed novel means for mitigating or modifying relative color difference signal values for producing acceptable flesh tones in the presence of severe deviations in chroma signal phase. Rather than attempting to restore all color difference signals to their nominal value in the presence of a single predetermined aberration, only two such color difference signals are operated upon, using values derived from all three signals. Further, it is only necessary to provide one amplification stage for the necessary signal "boost."

As will be evident from the foregoing description, certain aspects of the invention are not limited to the particular details of the examples illustrated. For example, substantial changes might be made in the construction of the inverting amplifier 36 shown in FIG. 4. Circuit values could also be changed substantially without deviating from the teaching of the present invention, and other signal combining and attenuation means familiar to those skilled in the art could be substituted for those embodied in FIG. 4. It is accordingly intended that the appended claims shall cover all such modifications and applications as do not depart from the true spirit and scope of the invention.

What is claimed as new and desired to be secured by letters patent of the United States is:

1. In a color television receiver including means for processing a received television signal and for deriving first, second and third color difference signals therefrom, said color difference signals being susceptible of fluctuation above and below a predetermined value, means for reducing aberrations in flesh tones displayed by the receiver, comprising:

utilization means for receiving the color difference signals;

means for transmitting the first color difference signal to said utilization means;

amplifier means coupled to said means for transmitting the first color difference signals and inverting the polarity thereof with respect to said predetermined value;

means for combining the amplified, inverted first color difference signal and said second and third color difference signals to form two new color difference signals each comprising predetermined portions of said amplified, inverted first color difference signal and of said second and third color difference signals; and means for applying said new color difference signals to said utilization means.

2. In a color television receiver including means for processing a received television signal for deriving luminance signals and first, second and third color difference signals therefrom, said color difference signals being susceptible of fluctuation above and below a given value, means for reducing observed aberrations in flesh tones displayed by the receiver in the presence of aberrant phase shift in the received signal comprising:

utilization means for combining the luminance signals with ones of the color difference signals;

first, second and third circuit means for applying the first, second and third color difference signals respectively to said utilization means;

amplifier means coupled to said first circuit means for amplifying said first color difference signal by a predetermined amount and inverting the polarity thereof with respect to said given value;

fourth circuit means for coupling said amplifier means to said second and said third circuit means and for coupling said second and said third circuit means together;

whereby said second and said third circuit means transmit predetermined portions of said first, second and third color difference signals to said utilization means.

3. The invention defined in claim 2, further including switching means for selectively disabling said fourth circuit means.

4. The invention defined in claim 3, further including second switching means for selectively varying the value of the first, second and third color difference signals applied to said second and said third circuit means.

5. The invention defined in claim 4, wherein said fourth circuit means comprises a resistive network.

6. In a color television receiver including means for processing a received television signal comprising phase-modulated chrominance information, means for reducing observed aberrations in flesh tones displayed by the receiver in the presence of aberrant phase shift in the chrominance information comprising:

means for deriving red, blue and green color signals from the chrominance signals, each of said color signals being susceptible of fluctuation above and below a given, median value;

utilization means for receiving said color signals and producing a display therefrom, and having first, second and third input terminals for receiving ones of the color signals;

first circuit means for applying said red color signal to said first input terminal;

amplifier means having an input terminal coupled to said first circuit means for amplifying said red color signal by a predetermined amount and inverting the polarity thereof with respect to said given median value;

second circuit means for combining predetermined portions of said blue and said green color signals with the signal outputted by said amplifier means and applying the combined signals to said second input terminal of said utilization means; and third circuit means for combining predetermined portions of said blue and green color signals with the signal outputted by said amplifier means and applying the combined signals to said third input terminal of said utilization means.

7. The invention defined in claim 6, wherein the signal applied to said second input terminal comprises substantially 0.3 to 0.7 of said red color signal and 0.65 to 0.45 of said blue color signal, and the signal applied to said third input terminal comprises substantially 0.05 to 0.2 of said red color signal, 0.12 of said blue color signal, and 0.0 to 0.76 of said green color signal.

8. The invention defined in claim 7, further including switching means for disabling said second and said third circuit means, whereby only said blue color signal is applied to said second input terminal, and only said green color signal is applied to said third input terminal.

* * * * *